US011039155B2

(12) United States Patent
Jeon

(10) Patent No.: US 11,039,155 B2
(45) Date of Patent: Jun. 15, 2021

(54) IMAGE COMPRESSION METHOD AND IMAGE DECOMPRESSION METHOD

(71) Applicant: LINE Corporation, Tokyo (JP)

(72) Inventor: Sang Cheol Jeon, Seongnam-si (KR)

(73) Assignee: LINE Corporation, Tokyo (JP)

( * ) Notice: Subject to any disclaimer, the term of this patent is extended or adjusted under 35 U.S.C. 154(b) by 218 days.

(21) Appl. No.: 15/989,384

(22) Filed: May 25, 2018

(65) Prior Publication Data

US 2018/0343459 A1 Nov. 29, 2018

(30) Foreign Application Priority Data

May 26, 2017 (KR) .......................... 10-2017-0065217

(51) Int. Cl.
*H04N 19/436* (2014.01)
*H04N 19/167* (2014.01)
*H04N 19/172* (2014.01)
*H04N 19/105* (2014.01)
*H04N 19/46* (2014.01)
*H04N 19/54* (2014.01)

(52) U.S. Cl.
CPC ......... *H04N 19/436* (2014.11); *H04N 19/105* (2014.11); *H04N 19/167* (2014.11); *H04N 19/172* (2014.11); *H04N 19/46* (2014.11); *H04N 19/54* (2014.11)

(58) Field of Classification Search
CPC .. H04N 19/105; H04N 19/167; H04N 19/172; H04N 19/436; H04N 19/46; H04N 19/54
See application file for complete search history.

(56) References Cited

U.S. PATENT DOCUMENTS 5,420,638 A * 5/1995 Riglet .................... G06T 9/001
348/700
9,060,095 B2 6/2015 Petterson et al.
(Continued)

FOREIGN PATENT DOCUMENTS

KR 10-2009-0097319 A 9/2009
KR 10-2014-0129171 A 11/2014
(Continued)

OTHER PUBLICATIONS

Notification of Reason for Refusal dated Dec. 15, 2020 in Korean Application No. 10-2017-0065217.

*Primary Examiner* — Mohammed S Rahaman
(74) *Attorney, Agent, or Firm* — Harness, Dickey & Pierce, P.L.C.

(57) ABSTRACT

Provided is an image decompression method of decompressing an image including a first frame and at least one second frame following the first frame, based on the first frame and landmark location information of the at least one second frame, the image decompression method including: obtaining the first frame; setting at least one landmark of the first frame; obtaining the landmark location information of the at least one second frame; and generating the at least one second frame from the first frame, based on the landmark location information of the at least one second frame, wherein the landmark location information of the at least one second frame is location information of the set at least one landmark of the first frame, in the at least one second frame.

12 Claims, 13 Drawing Sheets

(56) References Cited

U.S. PATENT DOCUMENTS

| | | | |
|---|---|---|---|
| 2003/0212321 A1* | 11/2003 | Baxter, III | G06T 3/0043 |
| | | | 600/407 |
| 2008/0043848 A1* | 2/2008 | Kuhn | G06K 9/00711 |
| | | | 375/240.16 |
| 2010/0119157 A1* | 5/2010 | Kameyama | H04N 19/115 |
| | | | 382/195 |
| 2013/0265218 A1* | 10/2013 | Moscarillo | G06F 3/017 |
| | | | 345/156 |
| 2014/0016696 A1* | 1/2014 | Nelson | H04N 19/105 |
| | | | 375/240.12 |
| 2014/0016860 A1* | 1/2014 | Senechai | G06K 9/00302 |
| | | | 382/159 |
| 2015/0244980 A1* | 8/2015 | Matthews | H04N 19/46 |
| | | | 348/14.08 |
| 2016/0133002 A1* | 5/2016 | Rhee | G06K 9/00281 |
| | | | 382/103 |
| 2016/0133022 A1* | 5/2016 | Sarkis | G06K 9/78 |
| | | | 382/103 |
| 2018/0040133 A1* | 2/2018 | Srinivasan | H04N 19/56 |

FOREIGN PATENT DOCUMENTS

| | | |
|---|---|---|
| KR | 10-2016-0054783 A | 5/2016 |
| KR | 10-2016-0124891 A | 10/2016 |

* cited by examiner

FIG. 11
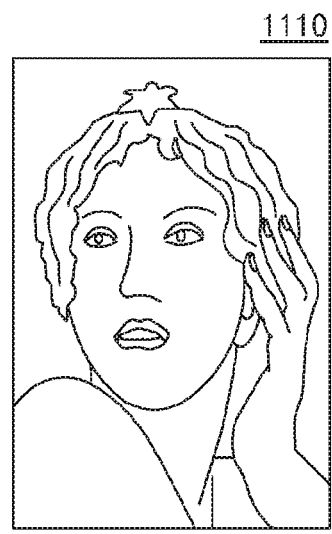
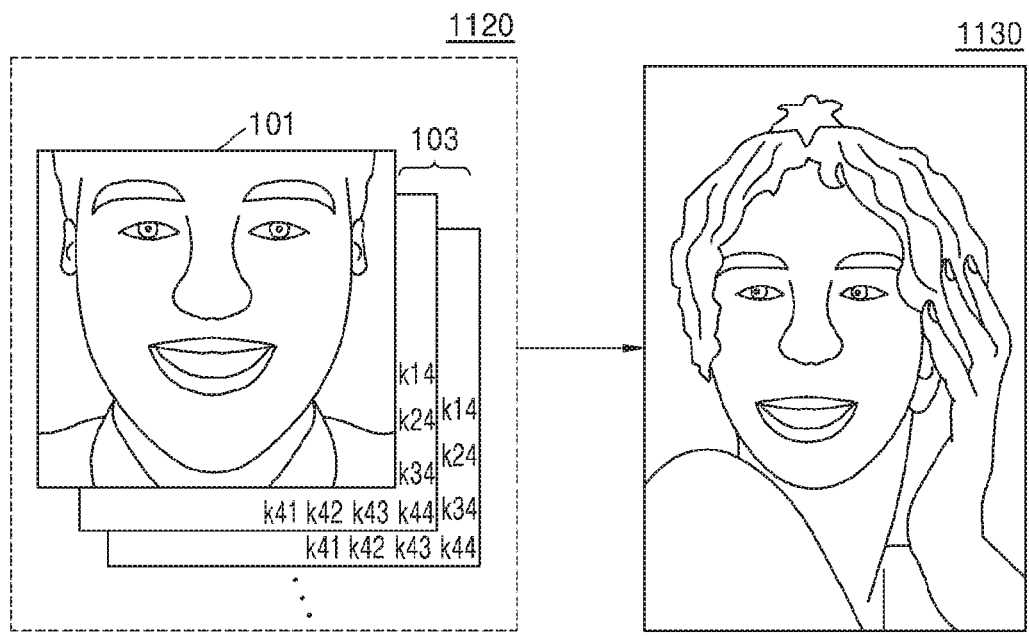

FIG. 12
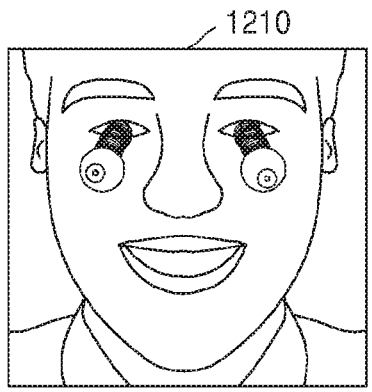
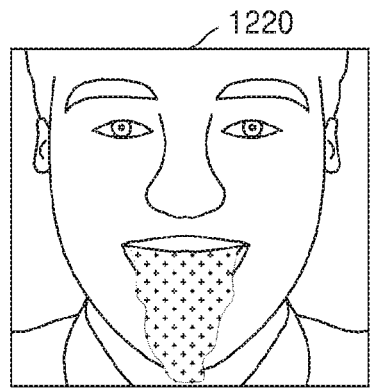
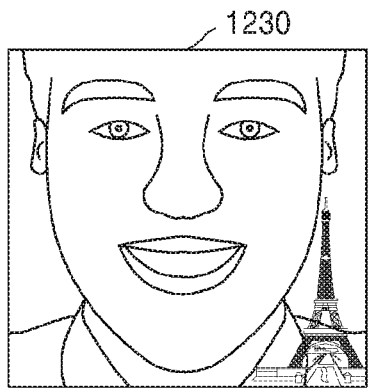
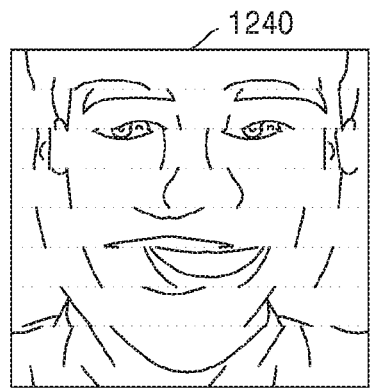
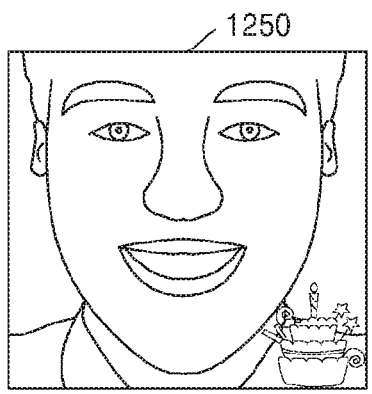

IMAGE COMPRESSION METHOD AND IMAGE DECOMPRESSION METHOD

CROSS-REFERENCE TO RELATED APPLICATION

This application claims priority under 35 U.S.C. § 119 to Korean Patent Application No. 10-2017-0065217 filed on May 26, 2017, in the Korean Intellectual Property Office, the entire contents of which are incorporated herein by reference.

BACKGROUND

1. Field

One or more embodiments relate to image compression and decompression methods, and more particularly, to a method of compressing an image including a plurality of frames into some frames and landmark location information of remaining frames of the image, or inversely, decompressing the image from the some frames and the landmark location information of the remaining frames of the image.

2. Description of the Related Art

This section provides background information related to the present disclosure which is not necessarily prior art.

With the rapid development of information and communication technology, various types of terminals, such as mobile communication terminals and personal computers, have been implemented to perform various functions.

For example, a mobile communication terminal is implemented to perform not only a basic voice communication function, but also, recently, various functions, such as a data communication function, a photographing or filming function using a camera, a music or video file reproducing function, a game playing function, and a broadcast viewing function.

Recently, various technologies have been implemented such that images are captured and transmitted or received in real-time through such terminals. However, transmitting or receiving of images not only excessively occupies communication resources, but also requires higher-speed and/or higher-bandwidth communication, and thus may not operate properly in a lesser communication environment.

SUMMARY

This section provides a general summary of the inventive concepts, and is not a comprehensive disclosure of its full scope or all features of the inventive concepts.

One or more embodiments include methods of more efficiently compressing and decompressing an image.

Also, one or more embodiments include a method of compressing an image including a plurality of frames into some frames and landmark location information of remaining frames of the image.

Also, one or more embodiments include a method of decompressing an image including a plurality of frames, based on some frames and landmark location information of remaining frames of the image. In particular, one or more embodiments include a method of decompressing an image by combining two images with reference to a template frame.

Additional aspects will be set forth in part in the description which follows and, in part, will be apparent from the description, or may be learned by practice of the presented embodiments.

According to one or more embodiments, an image decompression method of decompressing an image including a first frame and at least one second frame following the first frame, based on the first frame and landmark location information of the at least one second frame, the image decompression method including: obtaining the first frame; setting at least one landmark of the first frame; obtaining the landmark location information of the at least one second frame; and generating the at least one second frame from the first frame, based on the landmark location information of the at least one second frame, wherein the landmark location information of the at least one second frame is location information of the set at least one landmark of the first frame, in the at least one second frame.

The obtaining of the landmark location information may include: determining whether an event has occurred, based on the landmark location information of the at least one second frame and a certain time period, wherein the determining may include determining that the event has occurred when a frame following the at least one second frame is a new first frame or when the certain time period has passed from a point of time when the first frame is obtained.

The obtaining of the first frame may include repeatedly obtaining the first frame that is updated whenever an event occurs, the setting of the at least one landmark may include setting at least one landmark of the updated first frame, and the generating of the at least one second frame may include generating the at least one second frame from the updated first frame.

The image decompression method may further include, before the obtaining of the first frame, setting at least one landmark of at least one template frame, wherein the generating of the at least one second frame may include generating the at least one second frame from the at least one template frame, based on at least one of the first frame and the landmark location information of the at least one second frame.

The setting of the at least one landmark of the at least one template frame may include setting the at least one landmark of the at least one template frame, based on a user input with respect to the at least one template frame.

The generating of the at least one second frame may further include generating the at least one second frame by replacing at least a partial region of the at least one template frame by at least a partial region of the first frame.

The generating of the at least one second frame may include generating the at least one second frame by changing a location of the at least one landmark of the first frame, based on the landmark location information of the at least one second frame.

The at least one landmark may be set on at least one feature point of a human face included in the first frame.

The image including the first frame and the at least one second frame may be transmitted from a caller terminal to a callee terminal, the obtaining of the first frame may include obtaining the first frame from the callee terminal, the setting of the at least one landmark may include setting the at least one landmark on at least one feature point of an interlocutor's face included in the first frame, the obtaining of the landmark location information may include obtaining the landmark location information of the at least one second frame from the callee terminal, and the generating of the at least one second frame may include generating the at least one second frame by changing a location of the at least one feature point of the interlocutor's face from the first frame, based on the landmark location information of the at least one second frame.

According to one or more embodiments, an image compression method of compressing an image including a first frame and at least one second frame following the first frame, based on landmark location information, the image compression method includes: obtaining at least one of the first frame and the at least one second frame; setting at least one landmark of the first frame; identifying a location of the at least one landmark in the at least one second frame; and processing the first frame and processing a location of the at least one landmark in the at least one second frame, sequentially.

The identifying of the location may include determining whether an event has occurred, based on landmark location information of the at least one second frame and a certain time period, wherein the determining may include determining that the event has occurred when a difference between landmark locations of adjacent second frames is equal to or higher than a certain difference, when the certain time period has passed from a point of time when the first frame is obtained, or when a transmission request of the first frame is received from an external apparatus.

The obtaining may include repeatedly obtaining the first frame that is updated whenever an event occurs, the setting of the at least one landmark may include setting the at least one landmark of the updated first frame, the identifying of the location may include identifying the location of the at least one landmark of the updated first frame in the at least one second frame, and the processing may include processing the updated first frame, and processing the location of the at least one landmark in the at least one second frame following the updated first frame, sequentially, The processing may include obtaining a user input of selecting a template frame to which the first frame and the location of the at least one landmark are to be applied.

The image including the first frame and the at least one second frame may be transmitted from a caller terminal to a callee terminal, the obtaining may include obtaining the first frame and the at least one second frame from an image obtainer of the caller terminal, and the processing may include sequentially transmitting, to the callee terminal, a location of the at least one landmark in the first frame and the location of the at least one landmark in the at least one second frame.

The image including the first frame and the at least one second frame may be stored in a caller terminal, the obtaining may include obtaining the first frame and the at least one second frame from an image obtainer of the caller terminal, and the processing may include sequentially storing, in a storage unit of the caller terminal, a location of the at least one landmark in the first frame and the location of the at least one landmark in the at least one second frame.

According to one or more embodiments, a non-transitory computer-readable recording medium storing a computer program for decompressing an image comprising a first frame and at least one second frame following the first frame, based on the first frame and landmark location information of the at least one second frame, the computer program when executed by a computer performing the steps comprising: obtaining a first frame of an image comprising at least one second frame; setting at least one landmark of the first frame; obtaining landmark location information of a second frame of the image; and generating the second frame from the first frame, based on the landmark location information of the second frame, wherein the landmark location information of the second frame is location information of the set at least one landmark of the first frame, in the second frame.

BRIEF DESCRIPTION OF THE DRAWINGS

Example embodiments will be described in more detail with regard to the figures, wherein like reference numerals refer to like parts throughout the various figures unless otherwise specified, and wherein:

FIGS. 10 and 11 illustrate examples of decompressing an image obtained by a user terminal, according to embodiments; and FIGS. 12 and 13 illustrate various examples, in which an effect and an object are added to frames, according to embodiments.

Figure 1:
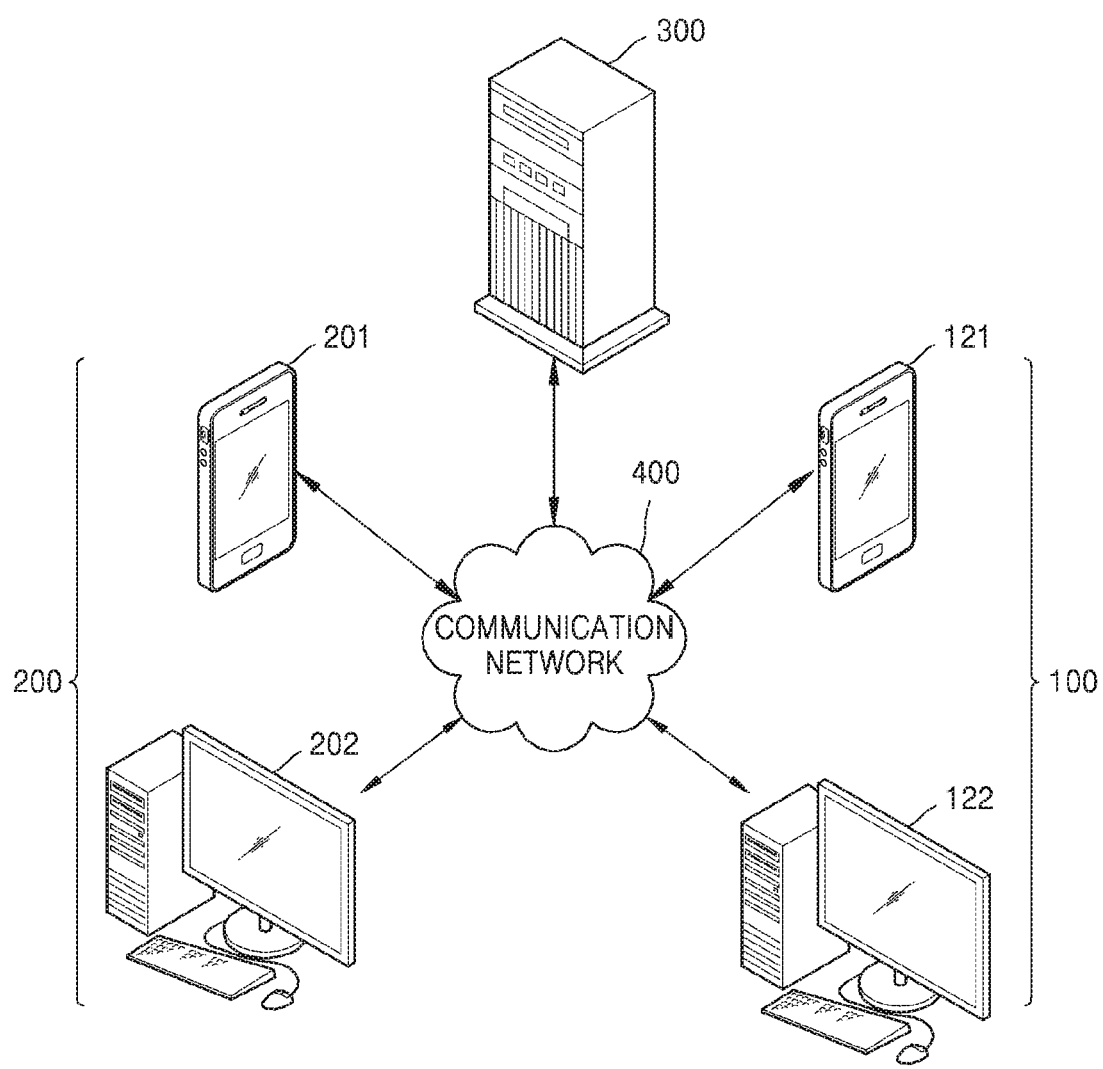
FIG. 1 is a diagram of an image compressing and decompressing system according to an embodiment.

It should be noted that these figures are intended to illustrate the general characteristics of methods and/or structures utilized in certain example embodiments and to supplement the written description provided below. These drawings are not, however, to scale and may not precisely reflect the precise structural or performance characteristics of any given embodiment, and should not be interpreted as defining or limiting the range of values or properties encompassed by the example embodiments.

DETAILED DESCRIPTION

One or more example embodiments will be described in detail with reference to the accompanying drawings. Example embodiments, however, may be embodied in various different forms, and should not be construed as being limited to only the illustrated embodiments. Rather, the illustrated embodiments are provided as examples so that this disclosure will be thorough and complete, and will fully convey the concepts of this disclosure to those of ordinary skill in the art. Accordingly, known processes, elements, and techniques, may not be described with respect to some example embodiments. Unless otherwise noted, like reference characters denote like elements throughout the attached drawings and written description, and thus descriptions will not be repeated.

Although the terms "first," "second," "third," etc., may be used herein to describe various elements, components, regions, layers, and/or sections, these elements, components, regions, layers, and/or sections, should not be limited by these terms. These terms are only used to distinguish one element, component, region, layer, or section, from another region, layer, or section. Thus, a first element, component, region, layer, or section, discussed below may be termed a second element, component, region, layer, or section, without departing from the scope of this disclosure.

Spatially relative terms, such as "beneath," "below," "lower," "under," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below," "beneath," or "under," other elements or features would then be oriented "above" the other elements or features. Thus, the example terms "below" and "under" may encompass both an orientation of above and below. The device may be otherwise oriented (rotated 90 degrees or at other orientations) and the spatially relative descriptors used herein interpreted accordingly. In addition, when an element is referred to as being "between" two elements, the element may be the only element between the two elements, or one or more other intervening elements may be present.

As used herein, the singular forms "a," "an," and "the," are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups, thereof. As used herein, the term "and/or" includes any and all combinations of one or more of the associated listed items. Expressions such as "at least one of," when preceding a list of elements, modify the entire list of elements and do not modify the individual elements of the list. Also, the term "exemplary" is intended to refer to an example or illustration.

When an element is referred to as being "on," "connected to," "coupled to," or "adjacent to," another element, the element may be directly on, connected to, coupled to, or adjacent to, the other element, or one or more other intervening elements may be present. In contrast, when an element is referred to as being "directly on," "directly connected to," "directly coupled to," or "immediately adjacent to," another element, there are no intervening elements present.

Unless otherwise defined, all terms (including technical and scientific terms) used herein have the same meaning as commonly understood by one of ordinary skill in the art to which example embodiments belong. Terms, such as those defined in commonly used dictionaries, should be interpreted as having a meaning that is consistent with their meaning in the context of the relevant art and/or this disclosure, and should not be interpreted in an idealized or overly formal sense unless expressly so defined herein.

Example embodiments may be described with reference to acts and symbolic representations of operations (e.g., in the form of flowcharts, flow diagrams, data flow diagrams, structure diagrams, block diagrams, etc.) that may be implemented in conjunction with units and/or devices discussed in more detail below. Although discussed in a particularly manner, a function or operation specified in a specific block may be performed differently from the flow specified in a flowchart, flow diagram, etc. For example, functions or operations illustrated as being performed serially in two consecutive blocks may actually be performed simultaneously, or in some cases be performed in reverse order.

Units and/or devices according to one or more example embodiments may be implemented using hardware, software, and/or a combination thereof. For example, hardware devices may be implemented using processing circuitry such as, but not limited to, a processor, a central processing unit (CPU), a controller, an arithmetic logic unit (ALU), a digital signal processor, a microcomputer, a field programmable gate array (FPGA), a system-on-chip (SoC), a programmable logic unit, a microprocessor, or any other device capable of responding to and executing instructions in a defined manner.

Software may include a computer program, program code, instructions, or some combination thereof, for independently or collectively instructing or configuring a hardware device to operate as desired. The computer program and/or program code may include program or computer-readable instructions, software components, software modules, data files, data structures, and/or the like, capable of being implemented by one or more hardware devices, such as one or more of the hardware devices mentioned above. Examples of program code include both machine code produced by a compiler and higher level program code that is executed using an interpreter.

For example, when a hardware device is a computer processing device (e.g., a processor, a CPU, a controller, an ALU, a digital signal processor, a microcomputer, a microprocessor, etc.), the computer processing device may be configured to carry out program code by performing arithmetical, logical, and input/output operations, according to the program code. Once the program code is loaded into a computer processing device, the computer processing device may be programmed to perform the program code, thereby transforming the computer processing device into a special purpose computer processing device. In a more specific example, when the program code is loaded into a processor, the processor becomes programmed to perform the program code and operations corresponding thereto, thereby transforming the processor into a special purpose processor.

Software and/or data may be embodied permanently or temporarily in any type of machine, component, physical or virtual equipment, or computer storage medium or device, capable of providing instructions or data to, or being interpreted by, a hardware device. The software also may be distributed over network coupled computer systems so that the software is stored and executed in a distributed fashion. In particular, for example, software and data may be stored by one or more computer readable recording media, including tangible or non-transitory computer-readable storage media discussed herein.

According to one or more example embodiments, computer processing devices may be described as including various functional units that perform various operations and/or functions to increase the clarity of the description. However, computer processing devices are not intended to be limited to these functional units. For example, in one or more example embodiments, the various operations and/or functions of the functional units may be performed by other ones of the functional units. Further, the computer processing devices may perform the operations and/or functions of the various functional units without sub-dividing the operations and/or functions of the computer processing units into these various functional units.

Units and/or devices according to one or more example embodiments may also include one or more storage devices. The one or more storage devices may be tangible or non-transitory computer-readable storage media, such as random access memory (RAM), read only memory (ROM), a permanent mass storage device (such as a disk drive), solid state (e.g., NAND flash) device, and/or any other like data storage mechanism capable of storing and recording data. The one or more storage devices may be configured to store computer programs, program code, instructions, or some combination thereof, for one or more operating systems and/or for implementing the example embodiments described herein. The computer programs, program code, instructions, or some combination thereof, may also be loaded from a separate computer readable storage medium into the one or more storage devices and/or one or more computer processing devices using a drive mechanism. Such a separate computer readable storage medium may include a universal serial bus (USB) flash drive, a memory stick, a Blu-ray/DVD/CD-ROM drive, a memory card, and/or other similar computer readable storage media. The computer programs, program code, instructions, or some combination thereof, may be loaded into the one or more storage devices and/or the one or more computer processing devices from a remote data storage device via a network interface, rather than via a local computer readable storage medium. Additionally, the computer programs, program code, instructions, or some combination thereof, may be loaded into the one or more storage devices and/or the one or more processors from a remote computing system that is configured to transfer and/or distribute the computer programs, program code, instructions, or some combination thereof, over a network. The remote computing system may transfer and/or distribute the computer programs, program code, instructions, or some combination thereof, via a wired interface, an air interface, and/or any other similar medium.

The one or more hardware devices, the one or more storage devices, and/or the computer programs, program code, instructions, or some combination thereof, may be specially designed and constructed for the purposes of the example embodiments, or they may be known devices that are altered and/or modified for the purposes of example embodiments.

A hardware device, such as a computer processing device, may run an operating system (OS) and one or more software applications that run on the OS. The computer processing device also may access, store, manipulate, process, and create data in response to execution of the software. For simplicity, one or more example embodiments may be exemplified as one computer processing device; however, one of ordinary skill in the art will appreciate that a hardware device may include multiple processing elements and multiple types of processing elements. For example, a hardware device may include multiple processors or a processor and a controller. In addition, other processing configurations are possible, such as parallel processors.

Although described with reference to specific examples and drawings, modifications, additions and substitutions of example embodiments may be variously made according to the description by those of ordinary skill in the art. For example, the described techniques may be performed in an order different to that of the methods described, and/or components such as the described system, architecture, devices, circuit, and the like, may be connected or combined to be different from the above-described methods, or results may be appropriately achieved by other components or equivalents.

FIG. 1 is a diagram of an image compressing and decompressing system according to an embodiment.

Referring to FIG. 1, the image compressing and decompressing system according to an embodiment may include first and second user terminals 100 and 200, a server 300, and a communication network 400 connecting the first and second user terminals 100 and 200 and the server 300.

The first and second user terminals 100 and 200 of the image compressing and decompressing system according to an embodiment may compress an image including a plurality of frames to some frames and landmark location information of remaining frames of the image.

The first and second user terminals 100 and 200 of the image compressing and decompressing system according to an embodiment may decompress an image including a plurality of frames, based on some frames and landmark location information of remaining frames of the image.

Also, the first and second user terminals 100 and 200 of the image compressing and decompressing system according to another embodiment may decompress an image by combining two images with reference to a template frame while decompressing the image as described above, and details thereof will be described later.

In the present disclosure, an 'image' may denote a multimedia object including at least one frame. Here, a frame may denote an individual scene forming an image.

A frame may include a first frame and a second frame. Here, the first and second frames are named based on tan order of frames, and do not indicate that the first and second frames have different properties or are different types.

An image may include a plurality of image sections. Here, each image section may include a first frame, e.g., an initial frame, and at least one second frame following the first frame. In other words, an entire image may include a first frame included in each of a plurality of sections, and at least one second frame included in each of the plurality of sections. Here, an image may be divided into several sections based on an occurrence of an event, and descriptions about events will be provided later.

Meanwhile, an image may further include sound corresponding to each frame, in addition to the frame.

In the present disclosure, a 'landmark' of a frame may denote a suitable target for identifying the frame. For example, when each frame of an image includes a human face, a landmark may denote each part of the human face. Here, each part may denote a detailed part, such as 'a starting part of a left eyebrow', 'a right end part of lips', or the like.

Landmark setting rules may be pre-set. For example, as described above, when each frame includes a human face, the landmark setting rules may be pre-set such that landmarks are set with respect to, for example, 66 points on the human face. Here, before setting a landmark on a frame, a landmark setting target object may be recognized. However, an embodiment is not limited thereto.

The server 300 according to an embodiment may denote a device relaying communication between the first and second user terminals 100 and 200. Here, the server 300 may relay transmission and reception of an image between the first and second user terminals 100 and 200.

According to another embodiment, the server 300 may compress or decompress an image while relaying communication between the first and second user terminals 100 and 200. For example, the server 300 may receive a non-compressed image from one of the first and second user terminals 100 and 200 in a relatively good network environment, and compress and transmit an image as described below to transmit the image to the other one of the first and second user terminals 100 and 200 in a relatively bad network environment. On the other hand, the server 300 may receive an image from one of the first and second user terminals 100 and 200 in a relatively bad network environment, decompress the image, and transmit the image to the other one of the first and second user terminals 100 and 200 in a relatively good network environment. However, an embodiment is not limited thereto.

The communication network 400 connects the server 300 and the first and second user terminals 100 and 200 to each other. For example, the communication network 400 provides an access path for the first user terminal 100 to transmit or receive packet data to or from the second user terminal 200. Examples of the communication network 400 include wired networks, such as a local area network (LAN), a wide area network (WAN), a metropolitan area network (MAN), and an integrated service digital network (ISDN), and wireless networks, such as wireless LAN, CDMA, Bluetooth, and a satellite communication network, but are not limited thereto.

The first and second user terminals 100 and 200 may be any apparatuses capable of transmitting or receiving an image therebetween and/or to or from the server 300, and storing an image. Here, the first and second user terminals 100 and 200 may be mobile terminals 121 and 201 or personal computers 122 and 202. Alternatively, the first and second user terminals 100 and 200 may be various entertainment apparatuses including a set-top box and a television (TV). Accordingly, the image compressing and decompressing method may be used in various fields of transmitting or receiving an image, or handling an image. For example, the image compressing and decompressing method may be used in an image broadcasting field, or a field of compressing and storing an image or decompressing an original image from a compressed image. However, an embodiment is not limited thereto.

The first and second user terminals 100 and 200 may compress an image including a plurality of frames to some frames and landmark location information of remaining frames of the image. Also, the first and second user terminals 100 and 200 may decompress an image including a plurality of frames, based on some frames and landmark location information of remaining frames of the image. Also, while decompressing an image, the first and second user terminals 100 and 200 may decompress the image by combining two images with reference to a template frame.

Figure 2:
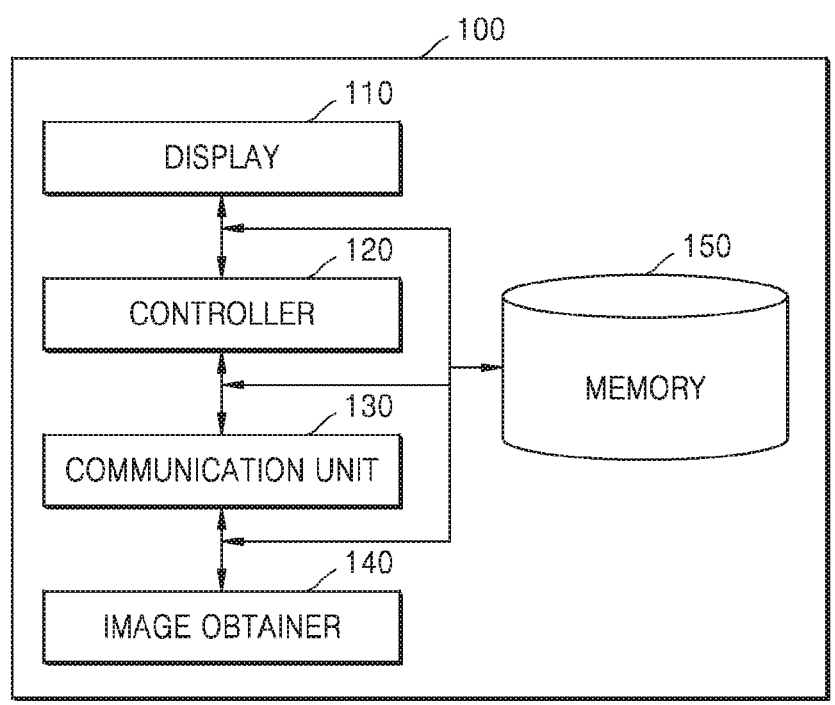
FIG. 2 is a block diagram of a configuration of a user terminal according to an embodiment.

FIG. 2 is a block diagram of a configuration of the first user terminal 100 according to an embodiment.

Referring to FIG. 2, the first user terminal 100 according to the current embodiment may include a display 110, a controller 120, a communication unit 130, an image obtainer 140, and/or a memory 150. Such a configuration is only an example, and the first user terminal 100 may not include some of the above components, or may include another component in addition to the above components.

The display 110 according to an embodiment may be a display device displaying a figure, a character, or a combination thereof, according to an electric signal generated by the controller 120 described below. For example, the display 110 may include one of a cathode ray tube (CRT), a liquid crystal display (LCD), a plasma display panel (PDP), and an organic light-emitting diode (OLED), but is not limited thereto.

Meanwhile, the display 110 may further include an input unit for receiving a user input. For example, the display 110 may further include a digitizer that reads touch coordinates of a user and converts the touch coordinates to an electric signal, so as to obtain a user input according to a screen displayed thereon. Accordingly, the display 110 may be a touch screen including a touch panel.

Here, the input unit may be provided separately from the display 110. For example, the input unit may be any one of a keyboard, a mouse, a track ball, a microphone, and a button provided separately from the display 110.

The controller 120 according to an embodiment may include any type of apparatus capable of processing data, such as a processor. Here, the 'processor' may be a data processing apparatus embedded in hardware and having a physically structured circuit to perform a function expressed in a code or command included in a program. Examples of such a data processing apparatus may include a microprocessor, a central processing unit (CPU), a processor core, a multiprocessor, an application-specific integrated circuit (ASIC), and a field programmable gate array (FPGA), but are not limited thereto.

The communication unit 130 according to an embodiment may be an apparatus including hardware and software required for the first user terminal 100 to transmit or receive a signal, such as a control signal or a data signal, to or from another network apparatus, such as the second user terminal 200 or the server 300, in a wired/wireless connection manner.

The image obtainer 140 according to an embodiment is a unit for capturing an image of a surrounding environment, and may include a lens and an image sensor. Here, the lens may be a lens group including at least one lens. The image sensor may change an image input through the lens to an electric signal. For example, the image sensor may be a semiconductor device capable of changing an optical signal to an electric signal (e.g., an image and/or a frame), such as a charge-coupled device (CCD) or a complementary metal oxide semiconductor (CMOS).

The memory 150 according to an embodiment temporarily or permanently stores data, instructions, programs, program codes, or combinations thereof, which are processed by the first user terminal 100. The memory 150 may include a magnetic storage medium or a flash storage medium, but is not limited thereto.

Since the descriptions of the first user terminal 100 may be identically applied to the second user terminal 200, descriptions of the second user terminal 200 will not be provided again. In other words, the first and second user terminals 100 and 200 are apparatuses having the same or similar configurations, and are denoted differently simply based on their functions in one or more embodiments of the present disclosure.

Hereinafter, an image compression method by which the first and second user terminals 100 and 200 compress an image will be described first, and then an image decompression method by which the first and second user terminals 100 and 200 decompress a compressed image will be described.

Figure 3:
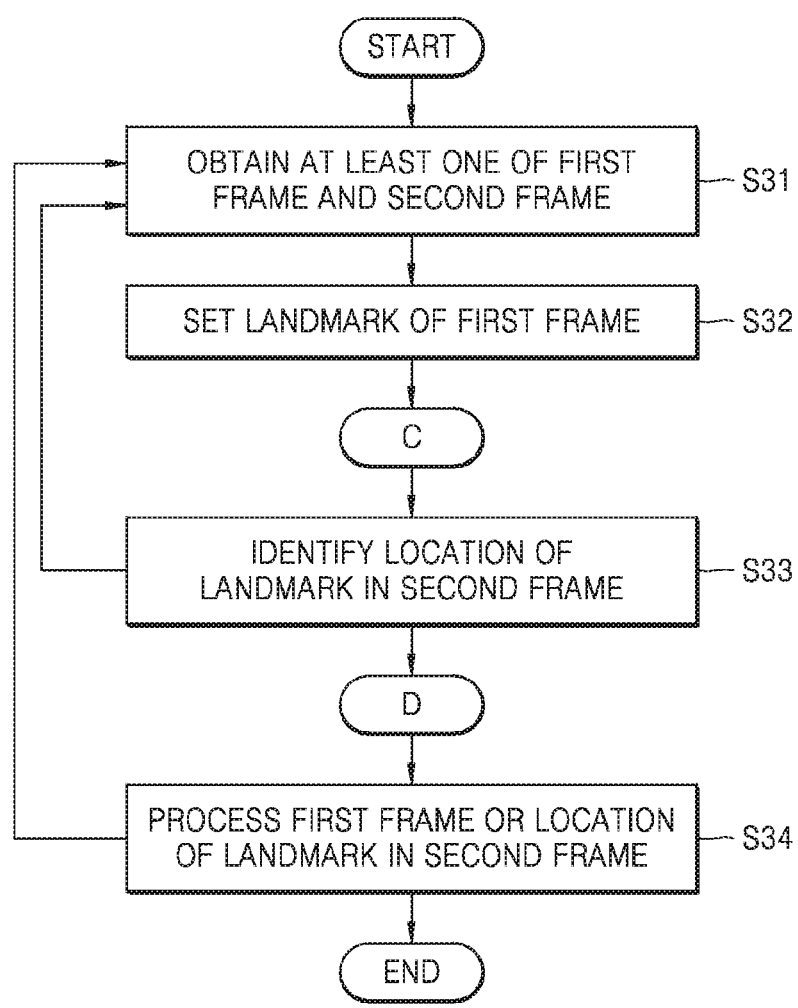
FIGS. 3 and 4 are flowcharts of an image compression method of compressing an image obtained by a user terminal, according to an embodiment.
Figure 4:
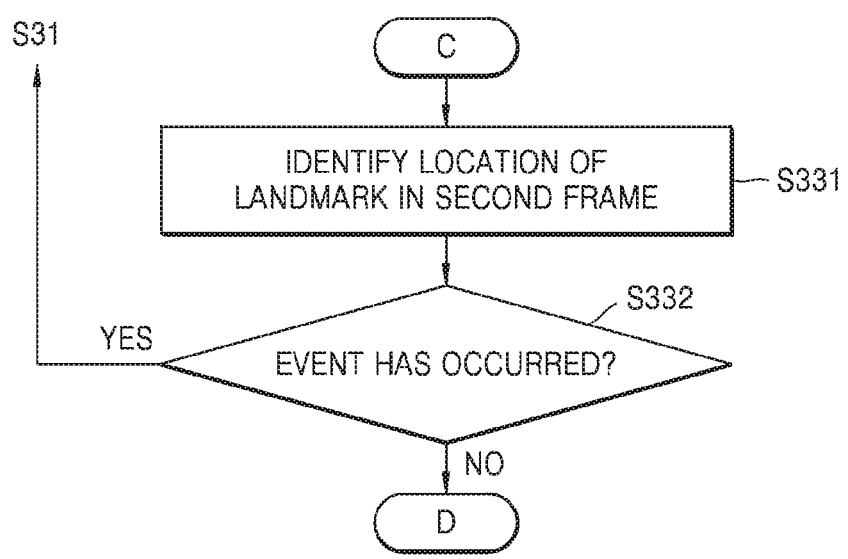
Figure 5:
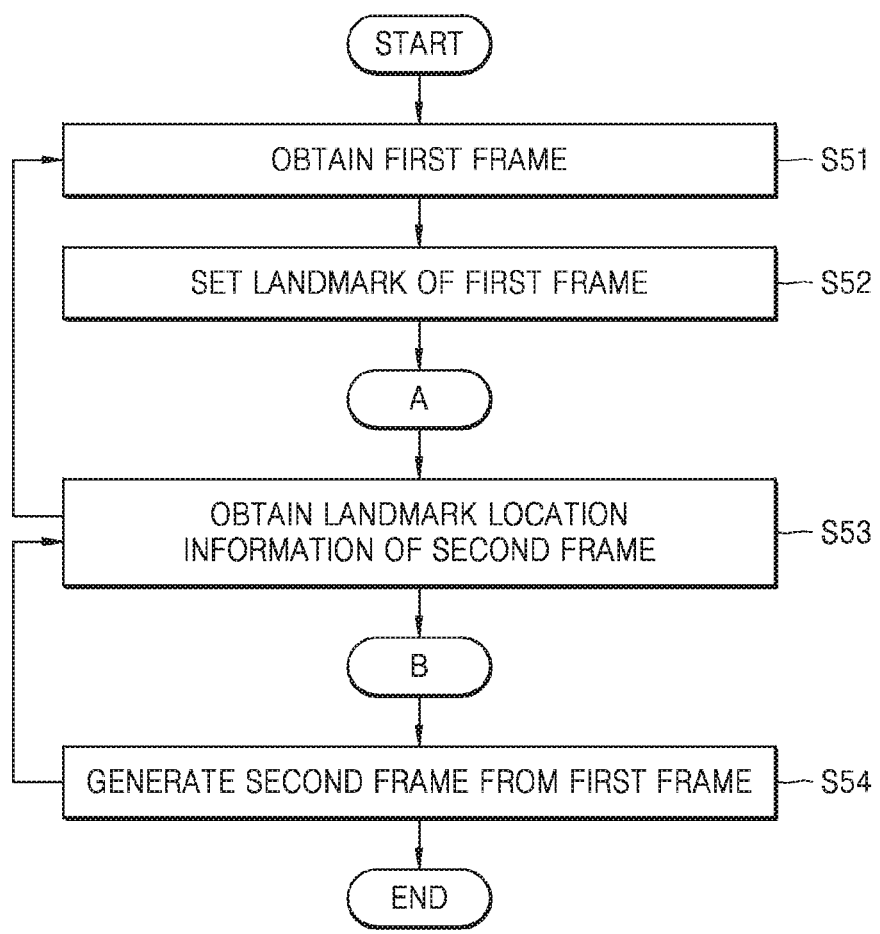
FIGS. 5 through 8 are flowcharts of an image decompression method of decompressing an image obtained by a user terminal, according to an embodiment.
Figure 6:
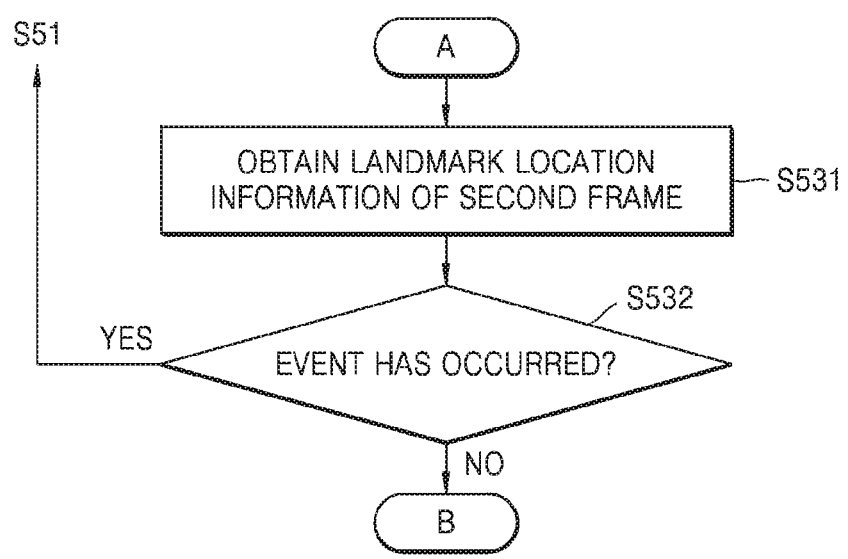

An image compression method of compressing an image obtained by the first and second user terminals 100 and 200, according to an embodiment will now be described with reference to FIGS. 3, 4, and 9.

The controller 120 according to an embodiment may compress an image including a plurality of frames to some frames and landmark location information of remaining frames of the image, as described above.

In this regard, the controller 120 according to an embodiment may obtain at least one of first frame 91 and at least one second frame 92, in operation S31. For example, when the image 910 to be compressed is an image obtained in real-time by the image obtainer 140, the controller 120 may sequentially and/or repeatedly obtain the first frame 91 and the second frame 92 from the image obtainer 140. Here, the controller 120 may obtain any one of the first frame 91 and the second frame 92, based on whether an event has occurred, as will be described in detail with reference to operation S33.

Meanwhile, when the image to be compressed is an image stored in the memory 150, the controller 120 may simultaneously or sequentially obtain the first frame 91 and the second frame 92. At this time as well, the controller 120 may repeatedly obtain the first frame 91 and the second frame 92 from the memory 150.

For example, the image compression method may be applied to a video call. In this case, the controller 120 may obtain an image including a plurality of frames from the image obtainer 140, in real-time. At this time, the first frame of the image obtained from the image obtainer 140 may be the first frame 91, and frames obtained after the first frame 91 may be the second frames 92. The first frame 91 may include a first image (for example, a face image) of a user after the video call begins, and the second frames 92 may include images (for example, face images) of the user changing according to time.

Then, in operation S32, the controller 120 according to an embodiment may set at least one landmark of the first frame 91 obtained in operation S31. Here, 'setting a landmark' in a frame may mean that an object that is a landmark target in the frame is searched for and recognized. For example, when the first frame 91 is a human face, setting at least one landmark of the first frame 91 may indicate searching for and recognizing each part of the human face in the first frame 91, as shown in an image 920 of FIG. 9. In detail, in the searching for and recognizing of each part of the human face in the first frame, the controller 120 may retrieve contours of a face, contours of a head, contours of eyes, contours of a nose, contours of lips, contours of ears, and contours of a spot or a mole, or other facial feature.

Here, the controller 120 may recognize contours of each landmark as a 'surface' instead of a 'line'. For example, the controller 120 may search for a region of the face, a region of the head, regions of the eyes, a region of the noise, regions of the lips, regions of the ears, and a region of the spot or mole, or other facial feature.

Then, the controller 120 may match each landmark to at least one point and/or pixel. For example, when the landmark is the contours of the face (or the region of the face), the controller 120 may match a line of the face to several points arranged along the line of the face. Similarly, the controller 120 may match the contours of the eyes to several points arranged along the contours of the eyes.

Meanwhile, rules about which part of a frame is to be set as a landmark, e.g., the landmark setting rules, may be pre-set. For example, as described above, when each frame includes a human face, the landmark setting rules may be pre-set such that landmarks are set with respect to, for example, 66 points on the human face. However, an embodiment is not limited thereto, and the landmark setting rules may be variously set based on purposes and/or environments of using the image compressing and decompressing system of the present disclosure.

The at least one landmark set by the controller 120 in the first frame 91 may be a target for identifying a location in the second frame 92.

The controller 120 according to an embodiment may identify a location of the at least one landmark in the at least one second frame 92, in operation S33. Here, the at least one landmark may be set in operation S32. In other words, the controller 120 may identify locations of landmarks set in the first frame 91, in the second frame 92.

Figure 9:
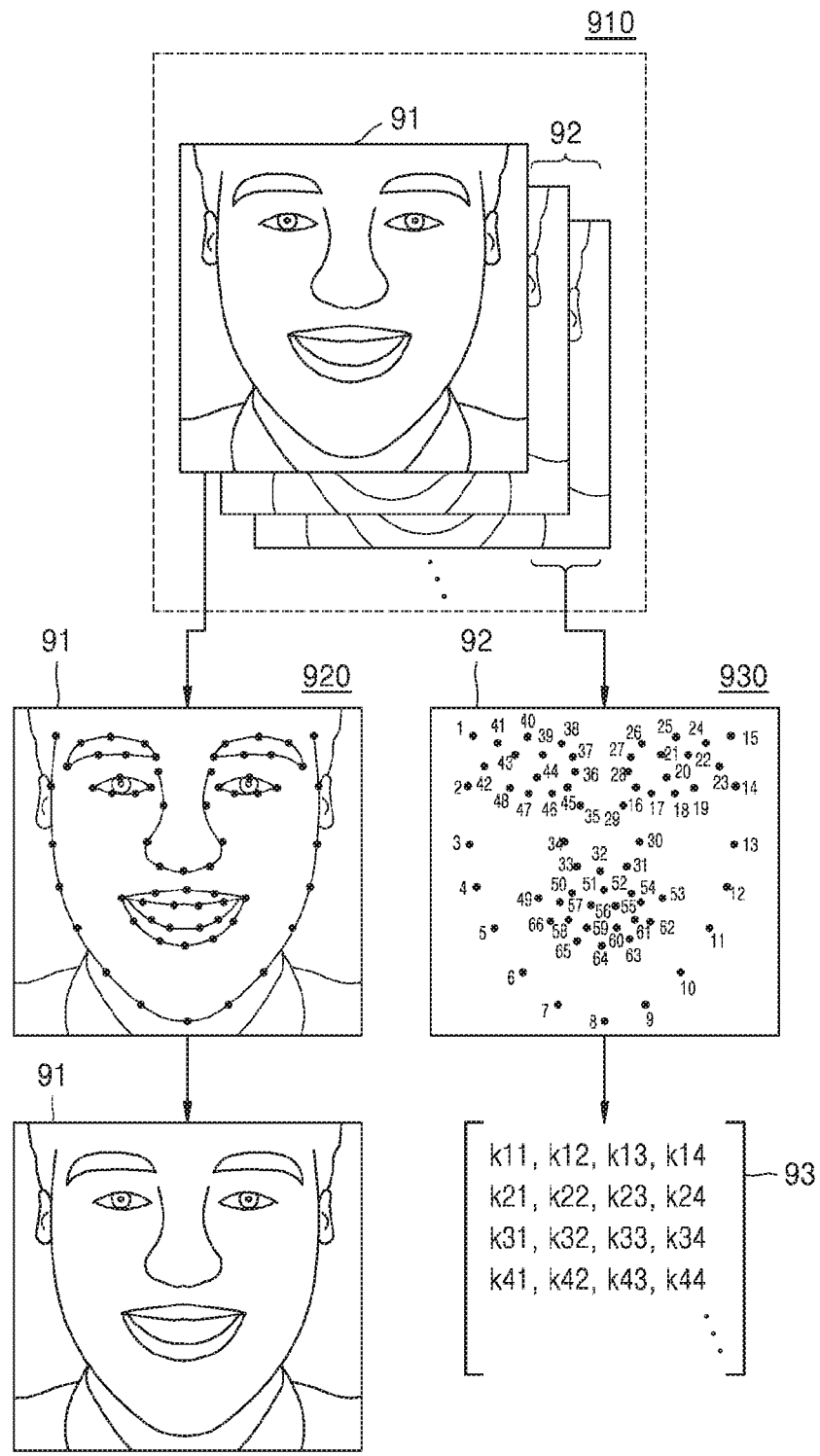
FIG. 9 illustrates an example of compressing an image obtained by a user terminal, according to an embodiment.
Figure 10:
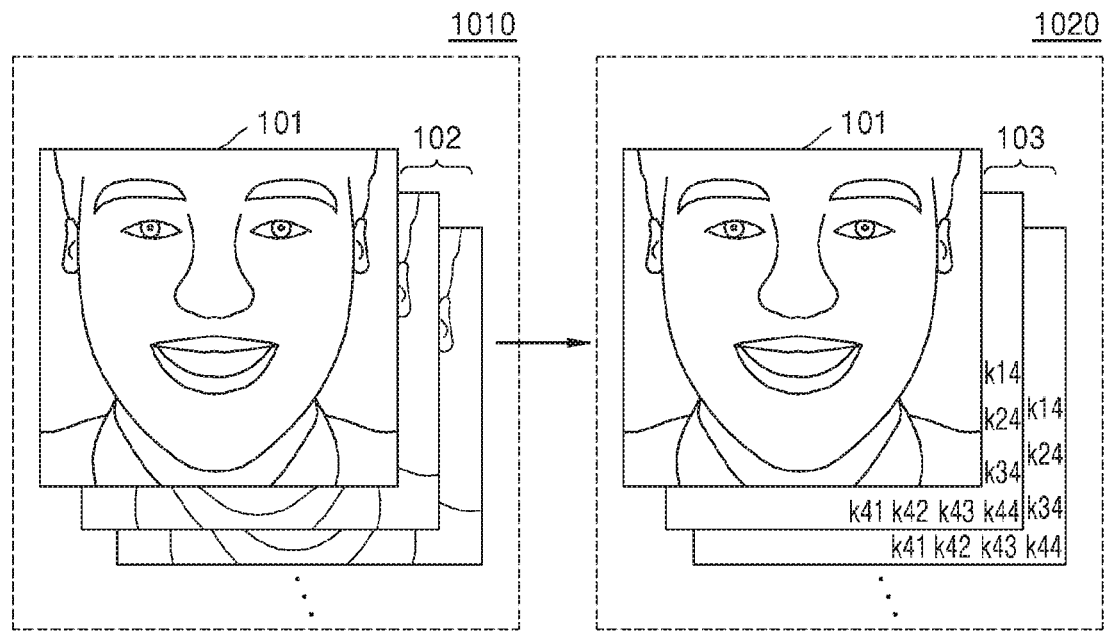

For example, the controller 120 according to an embodiment may identify the location of each landmark in the at least one second frame 92, in operation S331, as shown in an image 930 of FIG. 9.

For example, as described above, the landmark setting rules may be setting 66 points on a human face, and one of the 66 points may be a 'starting part of a left eyebrow'.

In this case, the controller 120 may search for and identify a location of the 'starting part of the left eyebrow' in the second frame 92. In other words, the controller 120 may generate landmark location information of the 'starting part of the left eyebrow' in the second frame 92. The landmark location information of the second frame 92 generated at this time may include, for example, coordinates of the 'starting point of the left eyebrow' in the second frame 92.

Meanwhile, in operation S332, the controller 120 may determine whether an event has occurred, based on a certain time period and the landmark location information of the at least one second frame 92 identified in operation S331.

For example, the controller 120 may determine that an event has occurred when a difference between landmark location information of the adjacent second frame 92 is equal to or higher than a certain difference. Here, the difference may be due to disappearance of a landmark setting target object, an increase in the number of landmark setting target objects, or covering of a landmark setting target object.

Also, the controller 120 may determine that an event has occurred when the certain time period is passed from a point of time when the first frame 91 is obtained. For example, the controller 120 may determine that an event has occurred when 10 seconds have passed from the point of time when the first frame 91 is obtained.

Also, the controller 120 may determine that an event has occurred when a transmission request of the first frame 91 is received from an external apparatus.

When it is determined that an event has occurred, the controller 120 may obtain an updated first frame 91, according to operation S31. On the other hand, when it is determined that an event has not occurred, the controller 120 may perform operation S34.

The controller 120 according to an embodiment may process the first frame 91 obtained in operation S31, and then sequentially process a location 93 of the at least one landmark in the at least one second frame 92 identified in operation S33, in operation S34.

Here, 'processing' of a frame and/or a location of a landmark may mean that the frame and/or the location of the landmark is transmitted to another user terminal through the communication unit 130, or stored in the memory 150.

Accordingly, the controller 120 may transmit the first frame 91 to another apparatus or store the first frame 91 in the memory 150, and then may transmit the location 93 of the landmark in the second frame 92 to the other apparatus or store the location 93 in the memory 150. Here, the controller 120 according to an embodiment may obtain an input related to selecting of a template frame to be applied to decompress the first frame 91 and the location 93 of the landmark in second frame 92. Details about the template frame will be described later while describing an image decompression method.

Meanwhile, when it is determined that an event has not occurred in operation S332, the controller 120 may perform operation S31 after performing operation S34. In other words, the controller 120 may repeatedly perform operations S31 through S34 on the at least one second frame 92 until the first frame 91 is updated according to an occurrence of an event.

As such, according to one or more embodiments of the present disclosure, an image may be transmitted or stored by using reduced or minimized resources and/or reduced or minimized storage spaces, and in addition, a template frame may be applied to the image according to a user's selection.

Hereinafter, an image decompression method of decompressing an image obtained by the first and second user terminals 100 and 200, according to an embodiment will be described with reference to FIGS. 5 through 8 and 10 through 13.

The controller 120 according to an embodiment may decompress an image, based on some frames, e.g., a first frame 101, and landmark location information 103 of remaining frames, e.g., second frames 102 of an image 1010 including a plurality of frames. Also, an image may be decompressed by combining two images with reference to a template frame 1110. Hereinafter, for convenience of description, it is described that the image 1010 including the plurality of frames is compressed to an image 1020 including the first frame 101 and the landmark location information 103 of the second frames 102.

The controller 120 according to an embodiment may obtain the first frame 101 of the image 1020 to be decompressed, in operation S51. For example, when an image to be decompressed is an image obtained by the communication unit 130 from another apparatus in real-time, the controller 120 may sequentially and/or repeatedly obtain, from the communication unit 130, the first frame 101 and the landmark location information 103 of the second frames 102. On the other hand, when an image to be decompressed is an image stored in the memory 150, the controller 120 may obtain the first frame 101 from the memory 150. However, an embodiment is not limited thereto.

Then, the controller 120 according to an embodiment may set at least one landmark of the first frame 101 obtained in operation S51, in operation S52. Since the setting of the at least one landmark in the first frame 101 has been described above with reference to operation S32, details thereof will not be provided again.

Meanwhile, a method of setting a landmark of the first frame 101 while compressing an image and a method of setting a landmark of the first frame 101 while decompressing an image may be pre-arranged or shared methods.

Accordingly, a method of setting a landmark of the first frame 101 may be pre-stored in the memory 150 in a form of source code and/or a program, or may be received from another apparatus through the communication unit 130.

The controller 120 according to an embodiment may obtain the landmark location information 103 of the second frame 102 of the image 1010 to be decompressed, in operation S53. In other words, the controller 120 may obtain a location of the landmark set in the first frame 101, in the second frame 102. For example, when an image to be decompressed is an image obtained by the communication unit 130 from another apparatus in real-time, the controller 120 may sequentially and/or repeatedly obtain, from the communication unit 130, the landmark location information 103 of the second frame 102 together with the first frame 101. In other words, the controller 120 may obtain only the first frame 101 in a form of an image, and obtain the second frames 102, e.g., the remaining frames, in a form of location information. In other words, only the first frame 101 is obtained in a form of an image, having large capacity, and the remaining frames, e.g., the second frames 102, may be obtained in a form of number and/or character data, having small capacity.

Meanwhile, when an image to be decompressed is an image stored in the memory 150, the controller 120 may obtain the landmark location information 103 of the second frame 102 from the memory 150. At this time as well, only the first frame 101 may be stored in a form of an image, and the remaining frames, e.g., the second frames 102, may be stored in a form of number and/or character data. However, an embodiment is not limited thereto.

Here, the landmark location information 103 of the second frame 102 may include, for example, as location information of the landmark set in the first frame 101, in the second frame 102, coordinates of the landmark in the second frame 102.

Meanwhile, the controller 120 may obtain the landmark location information 103 of the second frame 102 in operation S531, and determine whether an event has occurred in operation S532, based on the landmark location information 103.

For example, the controller 120 may determine that an event has occurred when a frame following the second frame 102 is the first frame 101. Here, the controller 120 may determine that the following frame is the first frame 101 when the first frame 101 itself is received from an external apparatus or a signal notifying transmission of the first frame is received.

Also, the controller 120 may determine that an event has occurred when a certain time period has passed after a point of time when the first frame 101 is obtained.

When it is determined that an event has occurred, the controller 120 may obtain the updated first frame 101 according to operation S51. On the other hand, when it is determined that an event has not occurred, the controller 120 may perform operation S54.

The controller 120 according to an embodiment may generate the second frame 102 from the first frame 101 in operation S54, based on the landmark location information 103 of the second frame 102 obtained in operation S53.

For example, as described above, the landmark location information 103 may include the coordinates of the at least one landmark in the second frame 102. Accordingly, the controller 120 may generate the second frame 102 by changing the location of the at least one landmark of the first frame 101, based on the landmark location information 103 of the second frame 102, e.g., the coordinates. The first frame of an image decompressed as such may be the first frame 101, and the second frame of the image may be a frame in which only locations of landmarks are changed in the first frame 101, e.g., the first frame. In the case of a video call, a frame displayed first during the video call is the first frame 101 itself, and a frame displayed after the first frame 101 may be a frame in which only locations of landmarks are changed in the first frame 101. In other words, frames displayed during the video call may be the first frame 101 modified according to the landmark location information 103.

Here, the controller 120 may use various techniques to generate the more natural second frame 102. For example, the controller 120 may generate the second frame 102 from the first frame 101 by using a pixel liquify technique. Also, the controller 120 may generate the second frame 102 from the first frame 101 by using a machine learning technique. However, an embodiment is not limited thereto.

The controller 120 according to an embodiment may consecutively display, on the display 110, the first frame 101 and the second frame 102 generated in operation S54. For example, a human face in the image 1010 may move to the right, as indicated by a reference numeral 1030 of FIG. 10. In this case, the controller 120 may consecutively display the first frame 101 and the second frame 102 on the display 110. Here, the second frame 102 may have been generated based on the landmark location information 103 of the second frame 102 on which movement information of the human face is reflected.

Also, when the image compression and decompression methods are used for a video call, the controller 120 may display an image in which a background is not changed but only a landmark, e.g., a human face, is changed, by consecutively displaying the first frame 101 and the second frame 102 generated in operation S54. Here, the changing of the human face may indicate that the entire face is moved leftward, rightward, upward, or downward. Alternatively, the changing of the human face may indicate that only a part of the face is changed, for example, the mouth is opened, frowning of the eyebrows occurs, yawning occurs, the nostrils are flared, the eyes are blinked, or the eyes are covered.

Meanwhile, when it is determined that an event has not occurred in operation S532, the controller 120 may perform operation S53 after performing operation S54. In other words, the controller 120 may repeatedly perform operations S53 and S54 on the at least one second frame 102 until the first frame 101 is updated according to an occurrence of an event. By repeating operations S53 and S54, frames of a moving image may be generated and/or repeated constantly.

With respect to generating of the second frame 102, the controller 120 according to an embodiment may add various effects to the second frame 102 based on the landmark location information 103. For example, the controller 120 may apply a local effect on a certain landmark or an effect on an entire frame when the certain landmark is moved by a certain threshold value, by referring to the landmark location information 103 of the second frame 102.

For example, when the second frame 102 includes a human face, the controller 120 may detect a change, such as blinked eyes, closed eyes, widely opened eyes, a surprised face, or an opened mouth, by referring to the landmark location information 103 of the second frame 102. The controller 120 may add an effect of popped-out eyeballs as shown in image 1210 of FIG. 12 or an effect of a new object sticking out from the mouth as shown in image 1220 of FIG. 12, in response to the detected change. However, such an effect is only an example and is not limited thereto.

The controller 120 according to an embodiment may add various effects to the second frame 102 by referring to various information, with respect to generating of the second frame 102. For example, the controller 120 may add, to the second frame 102, an object and/or an effect corresponding to location information of the first or second user terminals 100 or 200, identification (ID) information of the first or second user terminals 100 or 200, state information of the first or second user terminals 100 or 200, or user information, by referring to one of such information.

For example, the controller 120 may add, to the second frame 102, an object symbolizing a landmark of a location of the first or second user terminals 100 or 200 by referring to the location information of the first or second user terminals 100 or 200, for example, the Eiffel Tower when the location of the first or second user terminals 100 or 200 is Paris, as shown in image 1230 of FIG. 12.

Also, the controller 120 may add a cracking effect to the second frame 102 when a battery power level is low by referring to battery state information of the first or second user terminals 100 or 200, as shown in image 1240 of FIG. 12.

Also, the controller 120 may add an object symbolizing an anniversary to the second frame 102 when a certain day corresponds to a special anniversary, such as birthday, by referring to user information, for example, a birthday cake image as shown in image 1250 of FIG. 12.

As such, according to one or more embodiments of the present disclosure, an image transmitted or stored by using reduced or minimized resources and/or reduced or minimized storage space may be more naturally decompressed and displayed, and in addition, various special effects may be easily and conveniently applied to the image.

Figure 7:
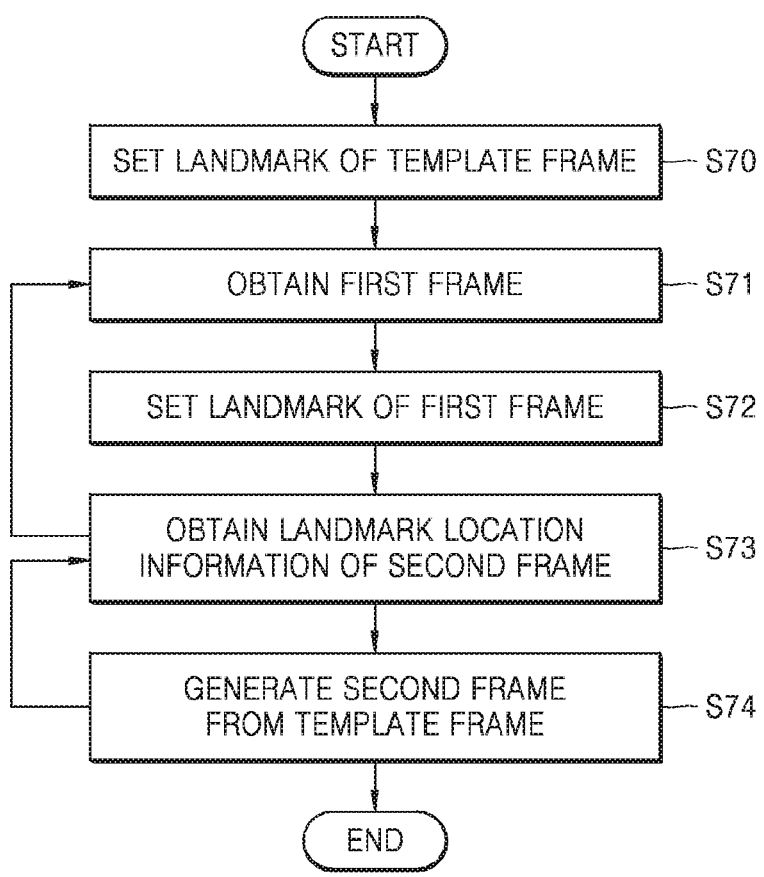

FIG. 7 is a flowchart for describing processes of decompressing an image by combining two images by referring to the template frame 1110 while the controller 120 decompresses the image, according to an embodiment. Hereinafter, details overlapping those of FIGS. 5 and 6 will not be provided again.

The controller 120 according to an embodiment may set a landmark of the template frame 1110 before obtaining the first frame 101, in operation S70. Here, the template frame 1110 may denote a frame including an image to be combined with an image 1120 to be decompressed, and there may be a plurality of the template frames 1110.

For example, as in the above example, when the image 1120 to be decompressed includes a human face, the template frame 1110 may include 'the face of Mona Lisa', 'the face of a plaster cast', or 'the face of a famous person'.

Also, when the image compression and decompression methods are used for a video call, the template frame 1110 may include a face of a callee and/or caller of the video call. When the face of the callee and/or caller is pre-stored in the first or second user terminals 100 or 200 as a template frame, the video call may be performed via only transmission and reception of landmark location information of a second frame without transmission and reception of a first frame. In other words, a video call may be performed without transmission and reception of an image (or a frame) by changing locations of landmarks in a pre-stored template frame based on received landmark location information of a second frame.

Such a template frame 1110 may be determined via the user's selection while an image is decompressed or while an image is compressed.

For example, when the image compression and decompression methods are used in a video call, in view of a caller terminal, the template frame 1110 may be determined by a callee to determine his/her face displayed on the caller terminal, or determined by a caller to determine the face of the callee the caller wants to see.

The controller 120 according to an embodiment may pre-set a landmark of the template frame 1110 so as to combine the template frame 1110 and the image 1120 to be decompressed. Since the setting of the landmark has been described above with reference to operation S32, details thereof will not be provided again.

Meanwhile, the setting of the landmark may be performed based on a user input. For example, when the controller 120 is unable to automatically recognize a landmark in the template frame 1110 due to low resolution and/or low quality of the template frame 1110, the controller 120 may set the landmark of the template frame 1110 based on a user input. Here, the controller 120 may display a landmark setting guide through the display 110.

Then, the controller 120 according to an embodiment may obtain the first frame 101 of an image to be decompressed, in operation S71. Also, the controller 120 according to an embodiment may set at least one landmark of the first frame 101 obtained in operation S71, in operation S72. Here, the controller 120 according to an embodiment may obtain the landmark location information 103 of a second frame 102 of the image to be decompressed, in operation S73.

The controller 120 according to an embodiment may generate a second frame 1130 from the template frame 1110 in operation S74, based on at least one of the first frame 101 and the landmark location information 103 of the second frame 102.

As described above, the landmark location information 103 may include coordinates of at least one landmark in the second frame 102, and thus the controller 120 may generate the second frame by changing a location of at least one landmark of the template frame 1110, based on the landmark location information 103 of the second frame 102, e.g., the coordinates. In other words, the controller 120 may generate the second frame by replacing an entire image by a shape included in the template frame 1110.

For example, when the image 1120 to be decompressed includes a human face and the template frame 1110 includes 'the face of a plaster cast', the controller 120 may generate the second frame including the face of the plaster cast, in which facial expressions and movements are all reflected to the face of the plaster cast.

Alternatively, the controller 120 may generate the second frame 1130 by changing the location of the at least one landmark of the template frame 1110, based on the landmark location information of the second frame 102, e.g., the coordinates, while replacing at least a portion of the template frame 1110 by at least a portion of the first frame 101.

For example, when the image 1120 to be decompressed includes a human face and the template frame 1110 includes 'the face of a plaster cast', the controller 120 may generate the second frame 1130, in which only a face part of an image of the plaster cast is replaced by the human face. Here, the landmark location information 103 of the second frame 102 may be reflected on a portion of the second frame 1130, which is replaced by the human face. Here, various technologies may be used for natural combining of two frames, e.g., the second frame 102 and the template frame 1110.

First, the controller 120 may recognize an object that is a landmark setting target from each of the template frame 1110 and the first frame 101. For example, when a landmark is set on a human face, the controller 120 may recognize the human face from each of the template frame 1110 and the first frame 101.

Also, the controller 120 may select at least one part of the object that is a landmark setting target recognized from the first frame 101, and blur the at least one part. Also, the controller 120 may calculate a display location and angle of the object that is a landmark setting target in the template frame 1110, and merge the blurred at least one part of the first frame 101 with the template frame 1110 based on the calculated display location and angle.

Here, the controller 120 may merge the blurred at least one part of the first frame 101 with the template frame 1110 considering a color difference or the like between the first frame 101 and the template frame 1110.

Also, since ratios (for example, distances between landmarks) of portions of the objects included in the template frame 1110 and the first frame 101 may be different from each other, the controller 120 may convert the landmark location information 103 of the second frame to location information of the template frame 1110.

The controller 120 may match the first frame 101 and the template frame 1110 by using various techniques, such as pixel liquify, machine learning, etc.

The controller 120 according to an embodiment may manipulate sound corresponding to each frame to correspond to the template frame 1110, together with processing of an image.

For example, when the template frame 1110 includes a face of a famous character or famous entertainer, and sound corresponding to each frame includes voice, the controller 120 may change the voice to voice of the famous character or famous entertainer included in the template frame 1110. According to a selective embodiment, the controller 120 may mute the sound.

Also, the controller 120 according to an embodiment may generate a new frame displayed on each frame, based on the sound corresponding to each frame.

Figure 13:
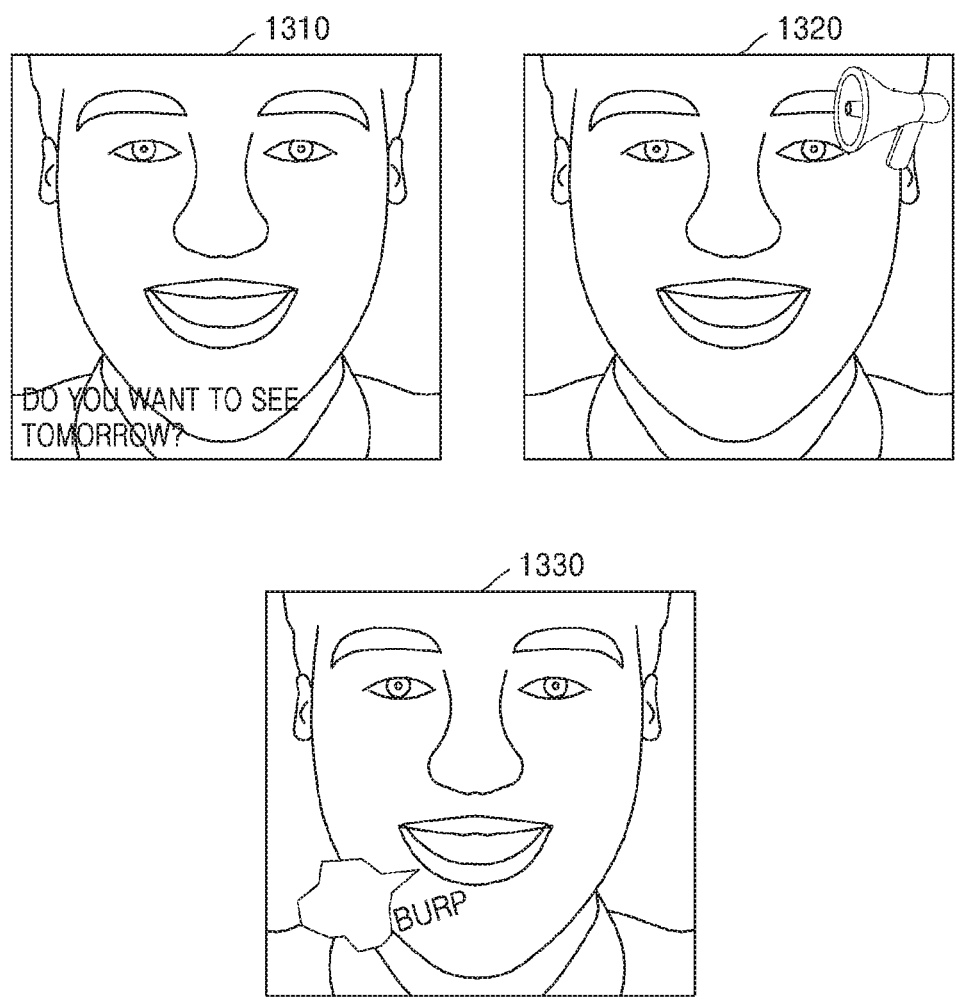

For example, when the sound corresponding to each frame includes voice, the controller 120 may generate a subtitle object corresponding to the voice and add the subtitle object to the frame, as shown in image 1310 of FIG. 13.

Also, when the sound corresponding to each frame includes a specifiable sound, such as a siren sound, certain notification sound, burp sound, flatulence sound, or bird sound, the controller 120 may generate and add, to the frame, an object corresponding to the specifiable sound. In other words, when the sound includes the siren sound, the controller 120 may add a siren mark to a frame as shown in image 1320 of FIG. 13, or when the sound includes the burp sound, the controller 120 may add a burp mark to a frame as shown in image 1330 of FIG. 13.

As such, according to one or more embodiments of the present disclosure, an image transmitted or stored by using reduced or minimized resources and/or reduced or minimized storage spaces may still be naturally decompressed and at the same time, more naturally composed, thereby arousing a user's interest.

Also, while decompressing an image, an image reflecting sound may be generated by referring to a sound corresponding to the image.

Figure 8:
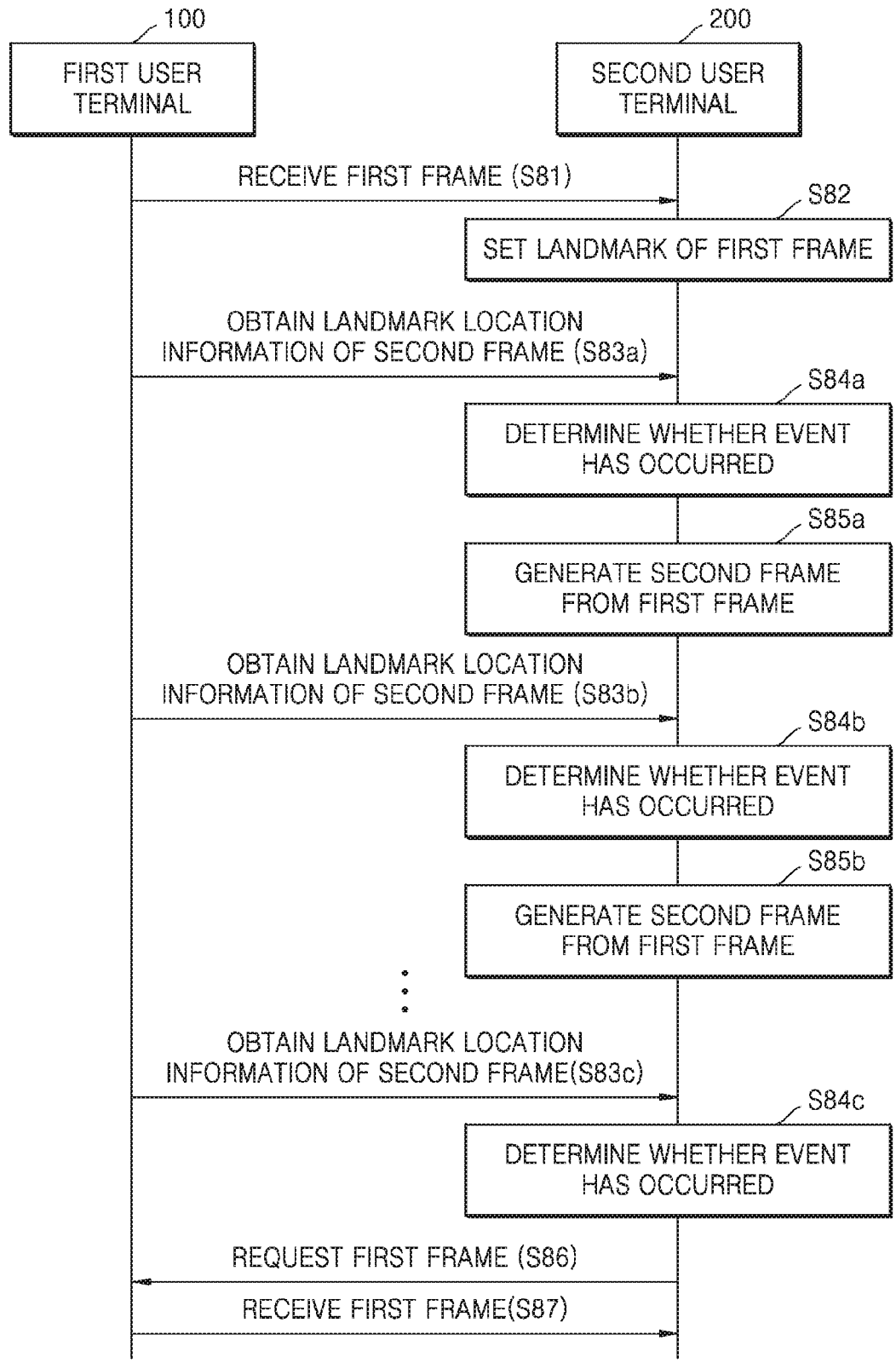

FIG. 8 is a flow diagram for describing processes performed when the image compression and decompression methods according to an embodiment are used for a video call. Hereinafter, details overlapping those of FIGS. 3 through 7 will not be provided again. Also, for convenience of description, only an aspect of the second user terminal 200 receiving an image from the first user terminal 100 will be described.

The second user terminal 200 according to an embodiment may receive a first frame from the first user terminal 100, in operation S81. Here, the first frame may be a frame included in an image obtained by an image obtainer of the first user terminal 100. Also, the second user terminal 200 may further receive, in addition to the first frame, a signal notifying initiation of a video call, ID information of a first user, or the like.

The second user terminal 200 may set at least one landmark of the received first frame, in operation S82. The second user terminal 200 may obtain landmark location information of a second frame, in operation S83a. The second user terminal 200 may determine whether an event has occurred based on the obtained landmark location information of the second frame, in operation S84a. The second user terminal 200 may generate the second frame from the first frame, based on the landmark location information of the second frame, in operation S85a. Refer to operations S52 through S54 of FIG. 5 for details about operations S82 through S85a.

The second user terminal 200 may repeatedly perform some of operations S82 through S85*a* until it is determined that an event has occurred. When it is determined that an event has occurred, the second user terminal 200 may request the first user terminal 100 for the first frame in operation S86, and receive the updated first frame in operation S87.

According to an embodiment, the first user terminal 100 may detect an event, and accordingly transmit the updated first frame to the second user terminal 200. In this case, the second user terminal 200 may detect reception of the updated first frame as an event, and perform an operation corresponding to the event.

Upon receiving the updated first frame, the second user terminal 200 may repeat operations S82 through S85*a* to receive and decompress a compressed image.

As such, according to one or more embodiments, a video call may be performed continuously with a lower bandwidth, and a data transmission/reception amount between the first and second user terminals 100 and 200 may be reduced during the video call. Accordingly, one or more embodiments may provide a video call capable of providing continuous and smooth images while maintaining a data transmission/reception amount at a level similar to that of a voice call.

According to one or more embodiments, a method of more efficiently compressing and/or decompressing an image may be provided.

Also, a method of compressing an image including a plurality of frames to some frames and landmark location information of remaining frames of the image may be provided.

Also, a method of decompressing an image including a plurality of frames, based on some frames and landmark location information of remaining frames of the image may be provided. At this time, a method of decompressing an image by combining two images with reference to a template frame may also be provided.

The foregoing description has been provided for purposes of illustration and description. It is not intended to be exhaustive or to limit the disclosure. Individual elements or features of a particular example embodiment are generally not limited to that particular embodiment, but, where applicable, are interchangeable and can be used in a selected embodiment, even if not specifically shown or described. The same may also be modified in various ways. Such modifications are not to be regarded as a departure from the disclosure, and all such modifications are intended to be included within the scope of the disclosure.

What is claimed is:

1. An image decompression method of decompressing an image comprising a first frame and at least one second frame following the first frame, based on the first frame and landmark location information of the at least one second frame, the image decompression method comprising:
    obtaining the first frame;
    setting at least one landmark of the first frame;
    obtaining the landmark location information of the at least one second frame; and
    generating the at least one second frame from the first frame, based on the landmark location information of the at least one second frame,
    wherein the landmark location information of the at least one second frame is location information of the set at least one landmark of the first frame, in the at least one second frame,
    wherein the obtaining of the landmark location information comprises determining whether an event has occurred, based on the landmark location information of the at least one second frame and a certain time period,
    wherein the determining comprises determining that the event has occurred when a frame following the at least one second frame is a new first frame or when the certain time period has passed from a point of time when the first frame is obtained, and
    wherein the obtaining of the first frame comprises repeatedly obtaining the first frame that is updated whenever an event occurs, the setting of the at least one landmark comprises setting at least one landmark of the updated first frame, and the generating of the at least one second frame comprises generating the at least one second frame from the updated first frame.

2. The image decompression method of claim 1, further comprising, before the obtaining of the first frame, setting at least one landmark of at least one template frame,
    wherein the generating of the at least one second frame comprises generating the at least one second frame from the at least one template frame, based on at least one of the first frame and the landmark location information of the at least one second frame.

3. The image decompression method of claim 2, wherein the setting of the at least one landmark of the at least one template frame comprises setting the at least one landmark of the at least one template frame, based on a user input with respect to the at least one template frame.

4. The image decompression method of claim 2, wherein the generating of the at least one second frame further comprises generating the at least one second frame by replacing at least a partial region of the at least one template frame by at least a partial region of the first frame.

5. The image decompression method of claim 1, wherein the generating of the at least one second frame comprises generating the at least one second frame by changing a location of the at least one landmark of the first frame, based on the landmark location information of the at least one second frame.

6. The image decompression method of claim 1, wherein the at least one landmark is set on at least one feature point of a human face included in the first frame.

7. The image decompression method of claim 6, wherein the image comprising the first frame and the at least one second frame is transmitted from a caller terminal to a callee terminal,
    the obtaining of the first frame comprises obtaining the first frame from the callee terminal,
    the setting of the at least one landmark comprises setting the at least one landmark on at least one feature point of an interlocutor's face included in the first frame,
    the obtaining of the landmark location information comprises obtaining the landmark location information of the at least one second frame from the callee terminal, and
    the generating of the at least one second frame comprises generating the at least one second frame by changing a location of the at least one feature point of the interlocutor's face from the first frame, based on the landmark location information of the at least one second frame.

8. An image compression method of compressing an image comprising a first frame and at least one second frame following the first frame, based on landmark location information, the image compression method comprising:

obtaining at least one of the first frame and the at least one second frame;

setting at least one landmark of the first frame;

identifying a location of the at least one landmark in the at least one second frame; and processing the first frame and processing a location of the at least one landmark in the at least one second frame, sequentially, wherein the identifying of the location comprises determining whether an event has occurred, based on landmark location information of the at least one second frame and a certain time period, wherein the determining comprises determining that the event has occurred when a difference between landmark locations of adjacent second frames is equal to or higher than a certain difference, when the certain time period has passed from a point of time when the first frame is obtained, or when a transmission request of the first frame is received from an external apparatus, and the obtaining comprises repeatedly obtaining the first frame that is updated whenever an event occurs, the setting of the at least one landmark comprises setting the at least one landmark of the updated first frame, the identifying of the location comprises identifying the location of the at least one landmark of the updated first frame in the at least one second frame, and the processing comprises processing the updated first frame, and processing the location of the at least one landmark in the at least one second frame following the updated first frame, sequentially.

9. The image compression method of claim 8, wherein the processing comprises obtaining a user input of selecting a template frame to which the first frame and the location of the at least one landmark are to be applied.

10. The image compression method of claim 8, wherein the image comprising the first frame and the at least one second frame is transmitted from a caller terminal to a callee terminal, the obtaining comprises obtaining the first frame and the at least one second frame from an image obtainer of the caller terminal, and the processing comprises sequentially transmitting, to the callee terminal, a location of the at least one landmark in the first frame and the location of the at least one landmark in the at least one second frame.

11. The image compression method of claim 8, wherein the image comprising the first frame and the at least one second frame is stored in a caller terminal, the obtaining comprises obtaining the first frame and the at least one second frame from an image obtainer of the caller terminal, and the processing comprises sequentially storing, in a storage unit of the caller terminal, a location of the at least one landmark in the first frame and the location of the at least one landmark in the at least one second frame.

12. A non-transitory computer-readable recording medium storing a computer program for decompressing an image comprising a first frame and at least one second frame following the first frame, based on the first frame and landmark location information of the at least one second frame, the computer program when executed by a computer performing the steps comprising:

obtaining a first frame of an image comprising at least one frame;

setting at least one landmark of the first frame;

obtaining landmark location information of a second frame of the image;

and generating the second frame from the first frame, based on the landmark location information of the second frame, wherein the landmark location information of the second frame is location information of the set at least one landmark of the first frame, in the second frame, wherein the obtaining of the landmark location information comprises determining whether an event has occurred, based on the landmark location information of the at least one second frame and a certain time period, wherein the determining comprises determining that the event has occurred when a frame following the at least one second frame is a new first frame or when the certain time period has passed from a point of time when the first frame is obtained, and wherein the obtaining of the first frame comprises repeatedly obtaining the first frame that is updated whenever an event occurs, the setting of the at least one landmark comprises setting at least one landmark of the updated first frame, and the generating of the at least one second frame comprises generating the at least one second frame from the updated first frame.

* * * * *